United States Patent
Chen et al.

(10) Patent No.: US 9,660,481 B2
(45) Date of Patent: May 23, 2017

(54) WIRELESS CHARGER ASSEMBLY MOUNTABLE ON DIFFERENT DESKS

(71) Applicant: FOXCONN INTERCONNECT TECHNOLOGY LIMITED, Grand Cayman (KY)

(72) Inventors: Cheng-Pang Chen, New Taipei (TW); Yung-Chang Cheng, New Taipei (TW); Chi-Ming Chen, New Taipei (TW); Jia-Hong Chen, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 130 days.

(21) Appl. No.: 14/583,824

(22) Filed: Dec. 29, 2014

(65) Prior Publication Data

US 2015/0188357 A1 Jul. 2, 2015

(30) Foreign Application Priority Data

Jan. 2, 2014 (TW) .............................. 103100014 A

(51) Int. Cl.
*H02J 7/02* (2016.01)
*H01F 27/02* (2006.01)
*H01F 27/30* (2006.01)
*H01F 38/14* (2006.01)
*H02J 7/00* (2006.01)
*H02J 5/00* (2016.01)

(52) U.S. Cl.
CPC .............. *H02J 7/025* (2013.01); *H01F 27/02* (2013.01); *H01F 27/306* (2013.01); *H01F 38/14* (2013.01); *H02J 5/005* (2013.01); *H02J 7/0042* (2013.01)

(58) Field of Classification Search
CPC ....................................................... H02J 7/025
See application file for complete search history.

(56) References Cited

U.S. PATENT DOCUMENTS

| 5,201,415 A | * | 4/1993 | Metz | ................... H05K 9/0067 206/707 |
| 7,511,452 B2 | | 3/2009 | Bersenev | |
| 8,362,744 B2 | | 1/2013 | Terao et al. | |

(Continued)

FOREIGN PATENT DOCUMENTS

| CN | 202197132 U | 4/2012 |
| CN | 202276198 U | 6/2012 |

(Continued)

*Primary Examiner* — Drew A Dunn
*Assistant Examiner* — Tynese McDaniel
(74) *Attorney, Agent, or Firm* — Wei Te Chung; Ming Chieh Chang

(57) ABSTRACT

A wireless charger assembly is used for transferring power to an electronic device through inductive charging. The wireless charger assembly includes a bottom case releasably mounted to an exterior flatbed, a transmitter coil, and a top case. The transmitter coil transmits power to a receiver coil of the electronic device through inductive charging. The top case has a working platform mounted around the working surface of the flatbed, a neck portion extending downwardly from the working platform, and a slot defined by the working platform and the neck portion. The neck portion releasably retained to the closed loop wall.

18 Claims, 10 Drawing Sheets

(56) References Cited

U.S. PATENT DOCUMENTS

| | | | |
|---|---|---|---|
| 8,373,310 B2 | 2/2013 | Baarman et al. | |
| 8,482,160 B2 | 7/2013 | Johnson et al. | |
| 8,868,939 B2 | 10/2014 | Matsuoka et al. | |
| 2010/0219183 A1* | 9/2010 | Azancot | H02J 5/005 219/676 |
| 2010/0290215 A1* | 11/2010 | Metcalf | A47B 21/00 362/127 |
| 2011/0057608 A1* | 3/2011 | Smith | A61L 2/00 320/108 |
| 2011/0062789 A1* | 3/2011 | Johnson | A47B 96/20 307/104 |
| 2011/0115433 A1 | 5/2011 | Lee et al. | |
| 2012/0146579 A1 | 6/2012 | Shukuya et al. | |
| 2012/0206090 A1 | 8/2012 | Hyun-Jun et al. | |
| 2013/0057203 A1* | 3/2013 | Jones | H02J 7/0042 320/108 |
| 2013/0207478 A1* | 8/2013 | Metcalf | A47C 7/70 307/104 |
| 2015/0380969 A1* | 12/2015 | Malmberg | H02J 7/025 320/108 |

FOREIGN PATENT DOCUMENTS

| | | |
|---|---|---|
| CN | 202918004 U | 5/2013 |
| CN | 203243078 U | 10/2013 |
| CN | 103401320 U | 11/2013 |
| CN | 203326626 U | 12/2013 |
| TW | 200941891 A | 10/2009 |

* cited by examiner

WIRELESS CHARGER ASSEMBLY MOUNTABLE ON DIFFERENT DESKS

BACKGROUND OF THE INVENTION

1. Field of the Invention

The present invention relates to a wireless charger assembly having transmitter coil, and more particularly to a wireless charger assembly fitting with different heights of desks.

2. Description of Related Art

U.S. Pat. No. 8,482,160, issued on Jul. 9, 2013, discloses an inductively coupled power module and circuit. The modules are designed to be mounted in, and adaptable to, a variety of surfaces having varying thicknesses. For example, the module is designed for mounting in a through-hole in which a cylindrical hole is bored through a panel and the module is inserted in the hole. A top surface of the module is exposed and may extend above the surface of the panel, be flush with the surface, or be sub-flush to the surface as desired in a given application. As for a high-profile adjustable module, a coil compression spring may be placed between an upper and a lower housings of the module, or between a first and a second telescoping components provided for adjustability of the extension of an induction coil from a housing.

Hence, a wireless charger assembly portably assembling to different desks is desired.

SUMMARY OF THE INVENTION

Accordingly, an object of the present invention is to provide a wireless charger assembly used for transferring power to an electronic device. The wireless charger assembly includes a bottom case mounted to an exterior flatbed, a transmitter coil, and a top case. The flatbed includes a working surface and a non-working surface opposite the working surface, and a through-hole extending through the working surface and a non-working surface. The bottom case includes a bottom floor releasably retained to the non-working surface, a closed loop wall projecting upwardly from the bottom floor to insert the through-hole therein, and a cavity defined by the bottom floor and the closed loop wall. The transmitter coil is disposed between the top case and bottom case and close to the top case. The top case has a working platform mounted around the working surface of the flatbed, a neck portion extending downwardly from the working platform, and a slot defined by the working platform and the neck portion. The neck portion releasably retained to the closed loop wall. The wireless charger assembly could be easily took part from the flatbed. The wireless charger assembly also provides an expandable height for different flatbeds.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
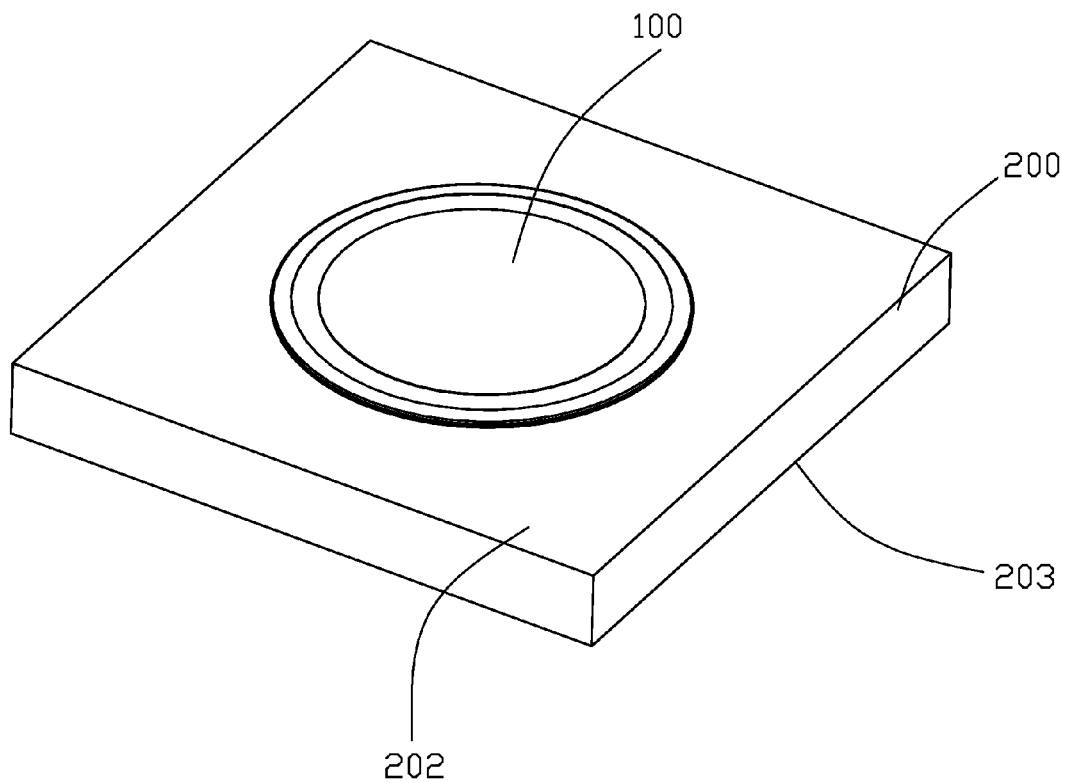
FIG. 1 is a perspective view of a wireless charger assembly mounted to an exterior flatbed according to a first embodiment of the present invention.
Figure 2:
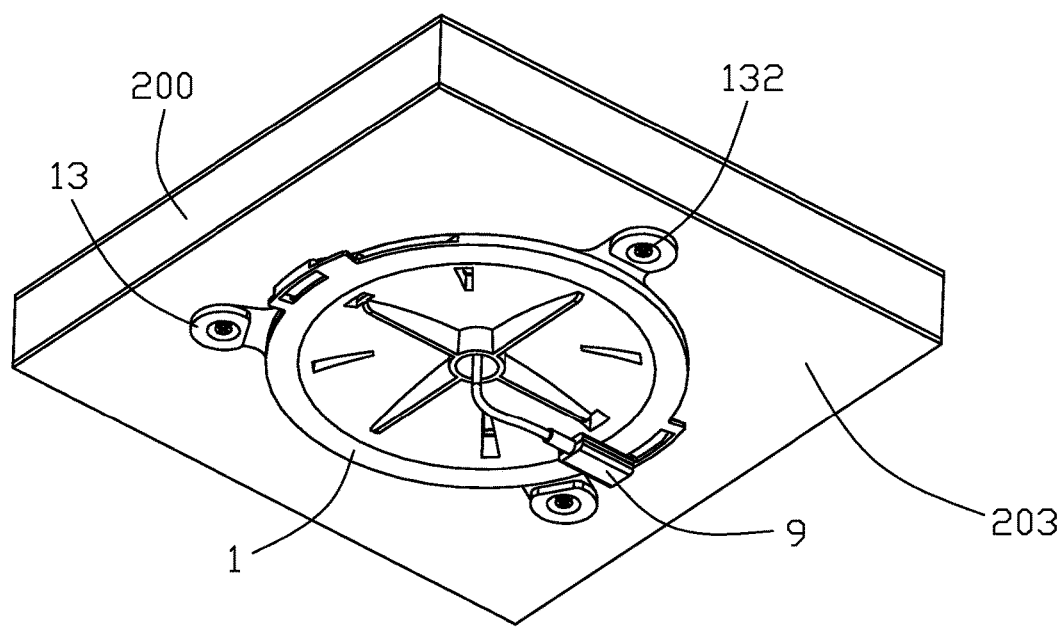
FIG. 2 is another perspective view of the wireless charger assembly shown in FIG. 1.
Figure 3:
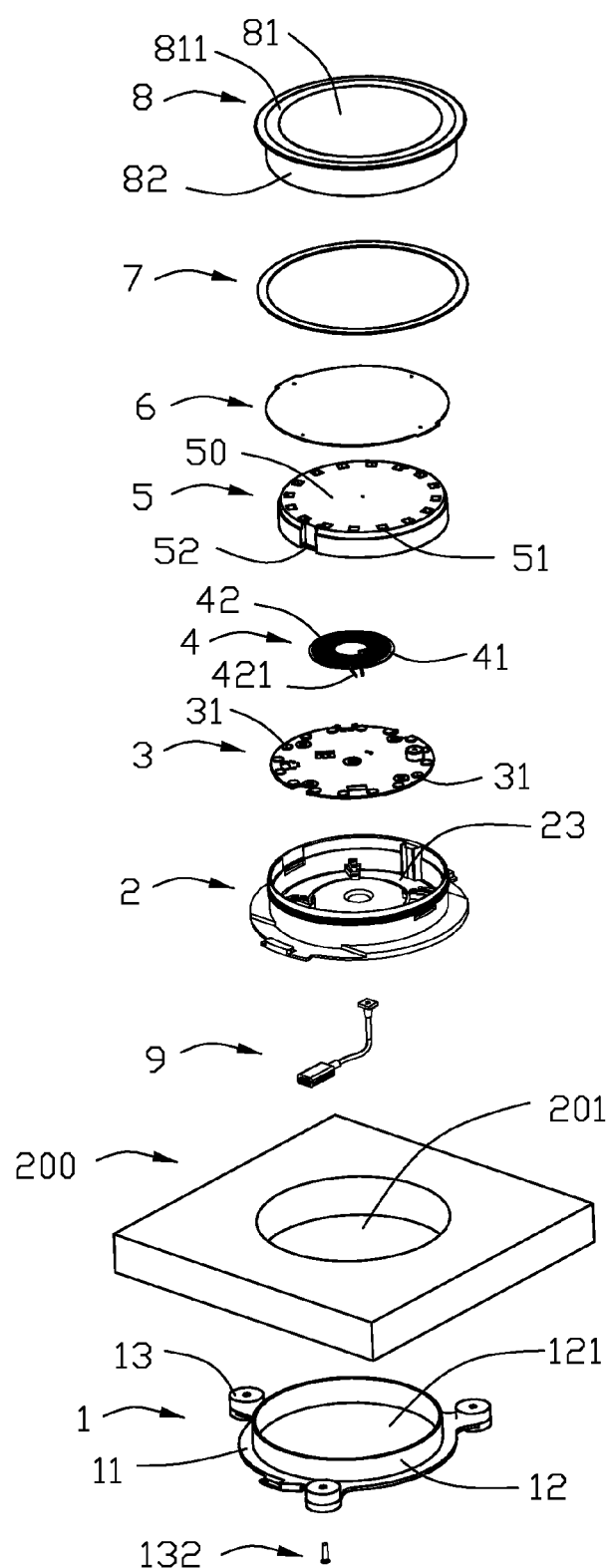
FIG. 3 is an exploded view of the wireless charger assembly shown in FIG. 1.
Figure 4:
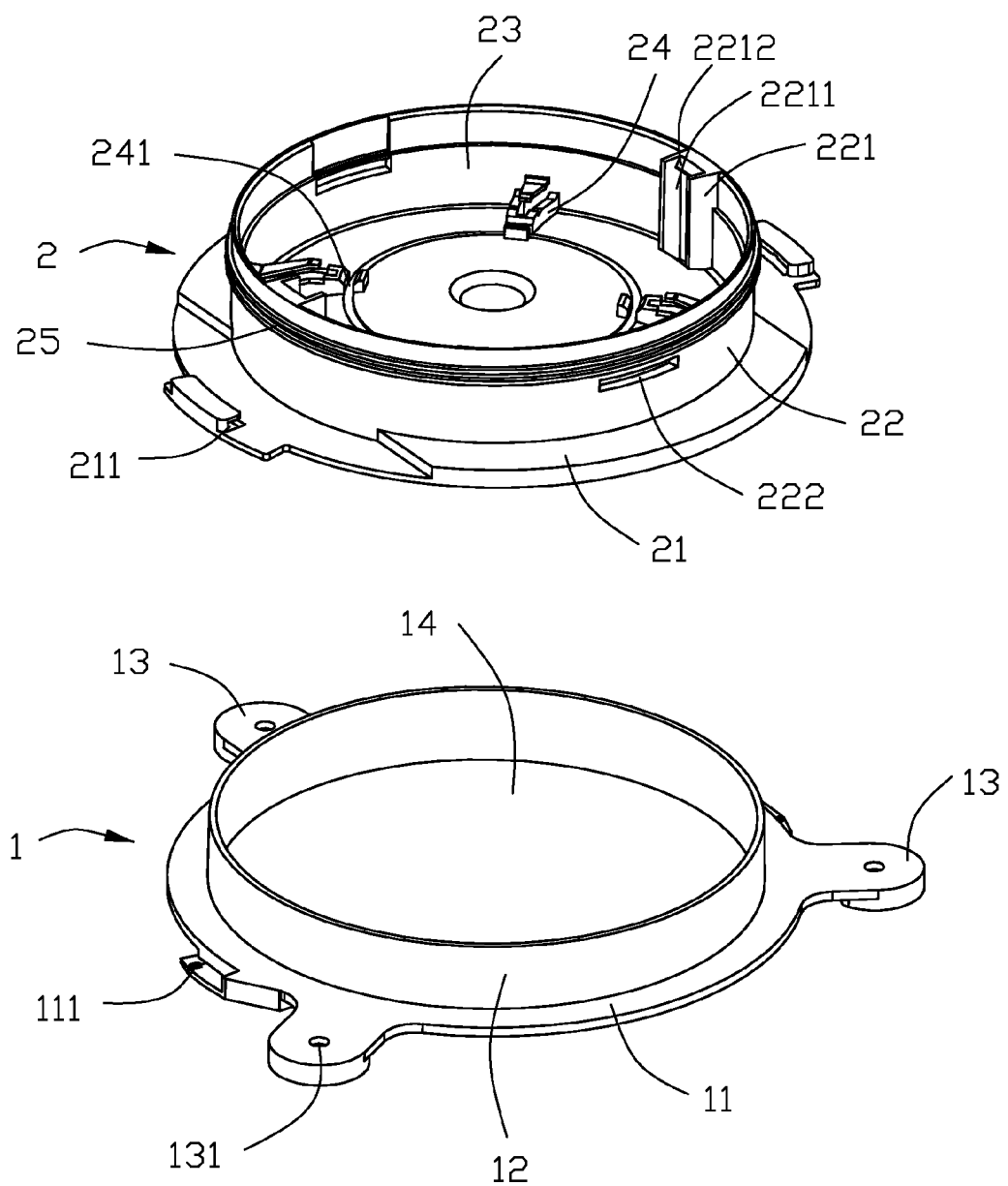
FIG. 4 is a perspective view of a holding bracket and a bottom case of the wireless charger assembly shown in FIG. 3.

Referring to FIGS. 1-4, a wireless charger assembly 100 according to a first embodiment of the present invention is shown.

The wireless charger assembly 100 is mounted to an exterior flatbed 200 of a desk, which could be used at an airport, a coffee shop, a supermarket, a furniture, etc. The flatbed 200 includes a working surface 202 and a non-working surface 203 opposite the working surface 202, and a through-hole 201 extending through the working surface 202 and a non-working surface 203. The wireless charger assembly 100 includes a holding bracket 1, a bottom case 2, a printed circuit board (PCB) 3, a transmitter coil 4, a light guiding component 5, a transparent tray 6, a rubber gasket 7, a top case 8, and a charging connector 9.

The holding bracket 1 has a substantially disk-shaped base portion 11, a circular ring-shaped wall 12 extending upwardly therefrom, and a plurality of fixing portion 13 uniformly distributed around a periphery edge of the base portion 11. There is a chamber 121 surrounded by the base portion 11 and the circular ring-shaped wall 12. Each fixing portion 13 defines a screw hole 131 extending therethrough along a top-to-bottom direction to insert in a screw 132. The screw 132 also inserts into a screw hole of the flatbed 200 to fix the holding bracket 1 to the non-working surface 203 of the flatbed 200. The base portion 11 has a clamp portion 111 secured to the bottom case 2.

The bottom case 2 includes a bottom floor 21 retained to the non-working surface 202, a closed loop wall 22 projecting upwardly from the bottom floor 21 to insert in the through-hole 201, and a (receiving) cavity 23 defined by the bottom floor 21 and the closed loop wall 22. The bottom floor 21 has a securing slot 211 for holding the clamp portion 111 of the holding bracket 1. The closed loop wall 22 has a locking ridge 221 projecting from an inner wall thereof, a guiding slot 2211 extending along the top-to-bottom direction, and a locking portion 2212 located above the guiding slot 2211. The bottom case 2 has a set of supporting pillar 24 protruding upwardly from a top face of bottom floor 21, a set of retaining apertures 222 extending through closed loop wall 22, and a set of interference grooves 241 defined by the supporting pillar 24.

The PCB 3 is received in the cavity 23 and has a plurality of light emitting diodes (LEDs) 31 surface mounted thereon. The LEDs 3 is arranged around an outer circumferential edge of the PCB 3.

The transmitter coil 4 is mounted on a top face of the PCB 4 and electrically connects with the PCB 4. The wireless charger assembly 100 transfers power to an electronic device (not shown) through inductive charging between the transmitter coil 4 and a receiver coil of the electronic device, which works as a primary coil and a second coil of a transformer. The transmitter coil 4 has a flexible core sheet 41 and a spiral coil 42 glued to the core sheet 41. Two ends of the coil 42 are physically connected to the PCB 4. The transmitter coil 4 is disposed between the top case 8 and bottom case 2 and close to the top case 8.

The light guiding component 5 covering the PCB 4 is partly received in the cavity 23. The light guiding component 5 has a main body 50, a plurality of guiding holes 51 extending along the top-to-bottom direction, and a locking barb 52 secured to the closed loop wall 22 of the bottom case 2. Each guiding hole 51 aligns with one corresponding SMT (surface mount technology) LED 3 and transmits light emerging therefrom.

The top case 8 has a working platform 81 mounted around the working surface 202 of the flatbed 200, a neck portion 82 extending downwardly from the working platform 81, and a slot defined by the working platform 81 and the neck portion 82. The neck portion 82 inserts across the through-hole 201 of the flatbed 200. The working platform 81 could mount above the working surface 202 or align with it. The working platform 81 has a transparent circle 811 to lead the light of the LEDs 3 from an inner side to an outer side of the wireless charger assembly 100. The top case 8 provides a plurality of internal thread 83, and the bottom case 2 provides a plurality of external threads 25 to interwork with the internal thread 83 for achieving a rotation lock therebetween.

The rubber gasket 7 is ring-shaped and has a central hole to the neck portion 82 inserting therein. The rubber gasket 7 is displaced between the working surface 202 and the working platform 81 to seal the through-hole 201 of the flatbed 200.

The transparent tray 6 is disposed between the top case 8 and the light guiding component 5. The charging connector 9 has one end connecting with the PCB 3 and the other end downwardly extending beyond the bottom case 2 to connecting with an exterior power supply (not shown). The charging connector 9 may be a female USB connector.

Figure 5:
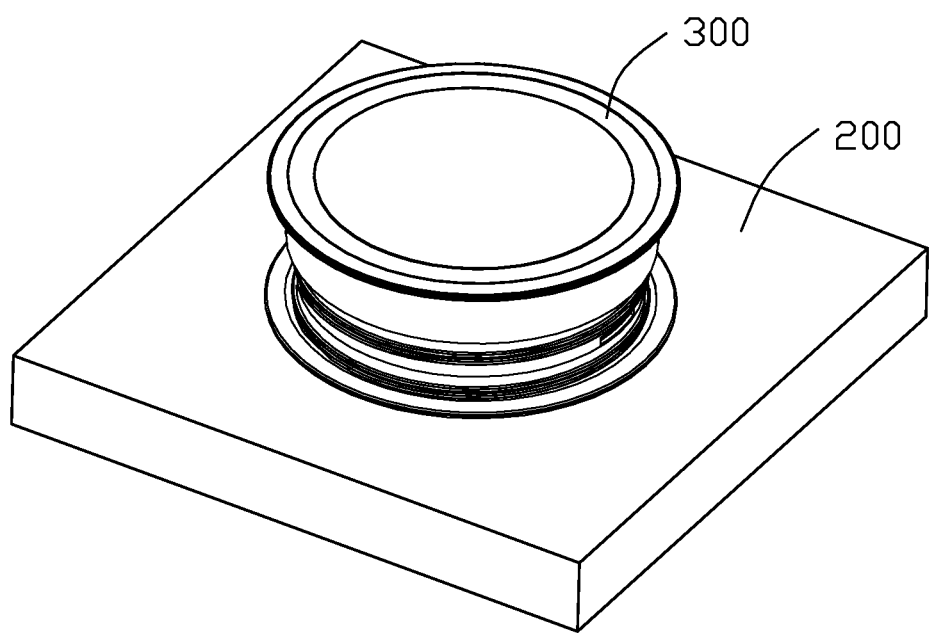
FIG. 5 is a perspective view of a wireless charger assembly mounted to another exterior flatbed according to a second embodiment of the present invention.
Figure 6:
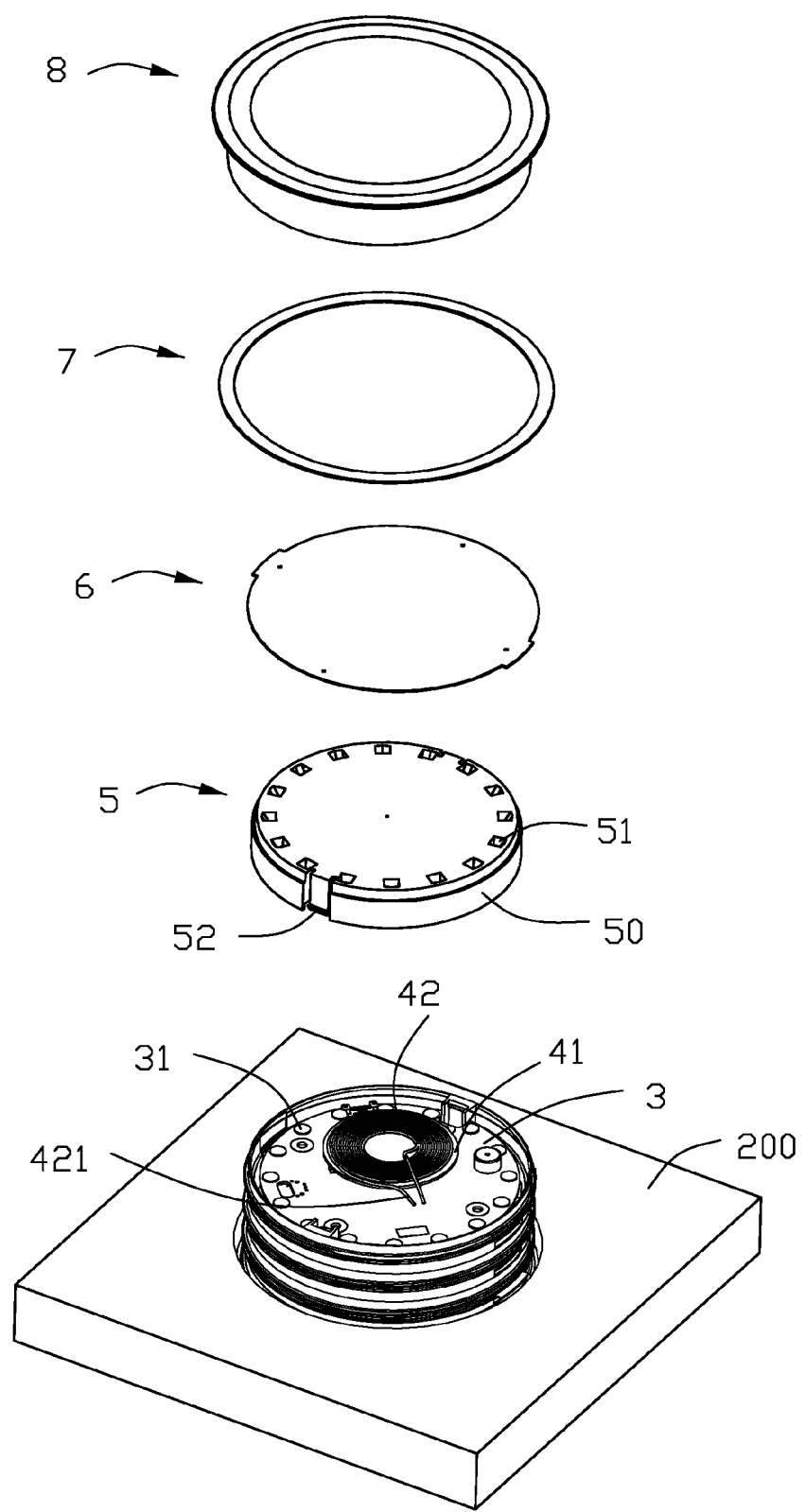
FIG. 6 is an exploded view of the wireless charger assembly and the flatbed shown in FIG. 5.
Figure 7:
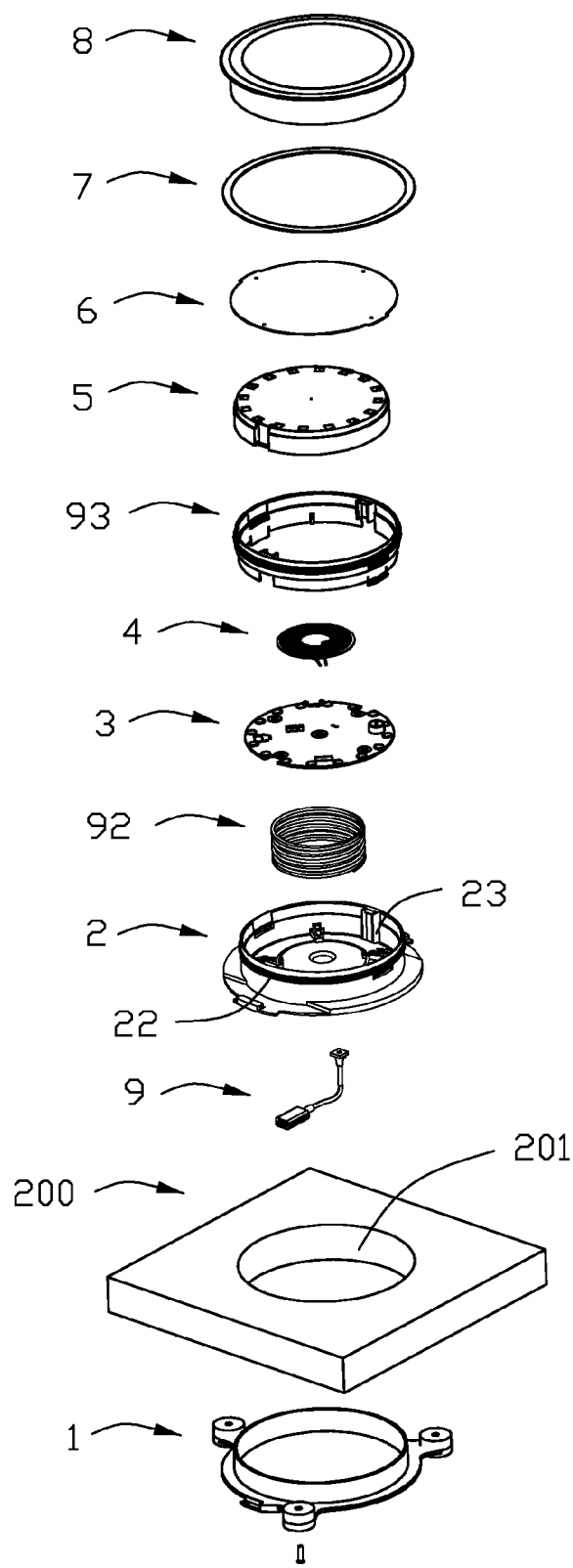
FIG. 7 is a further exploded view of the wireless charger assembly and the exterior flatbed shown in FIG. 6.
Figure 8:
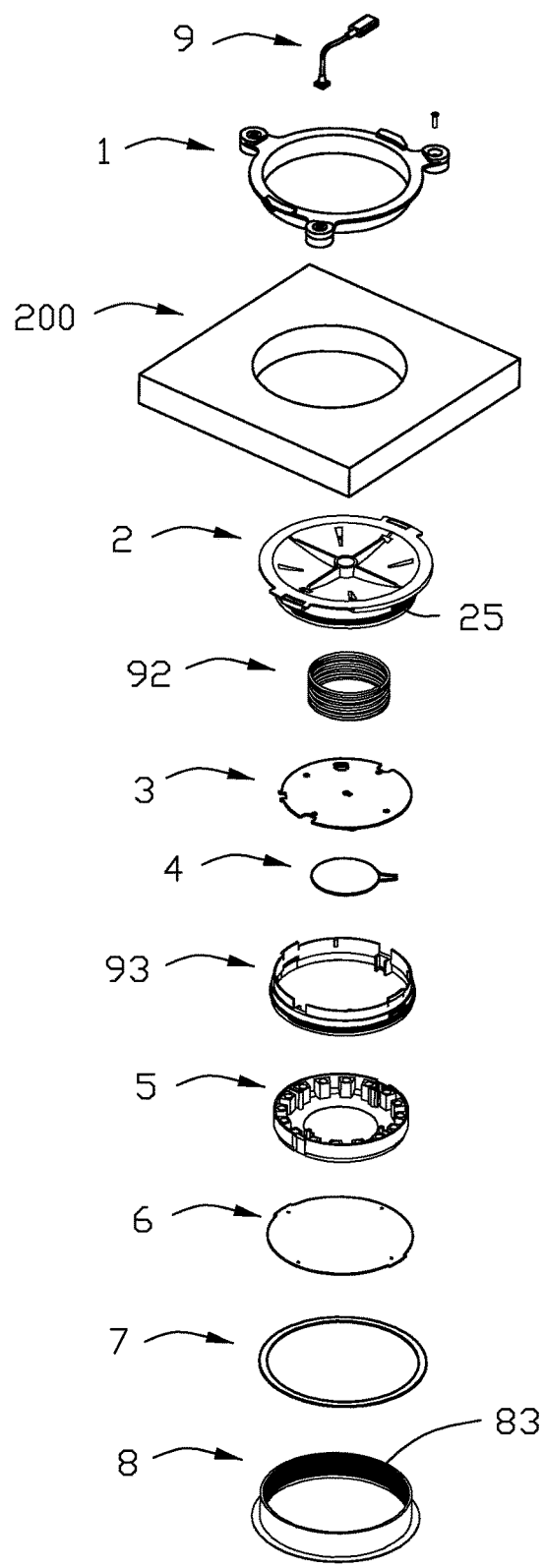
FIG. 8 is another exploded view of the wireless charger assembly and the exterior flatbed shown in FIG. 7.
Figure 9:
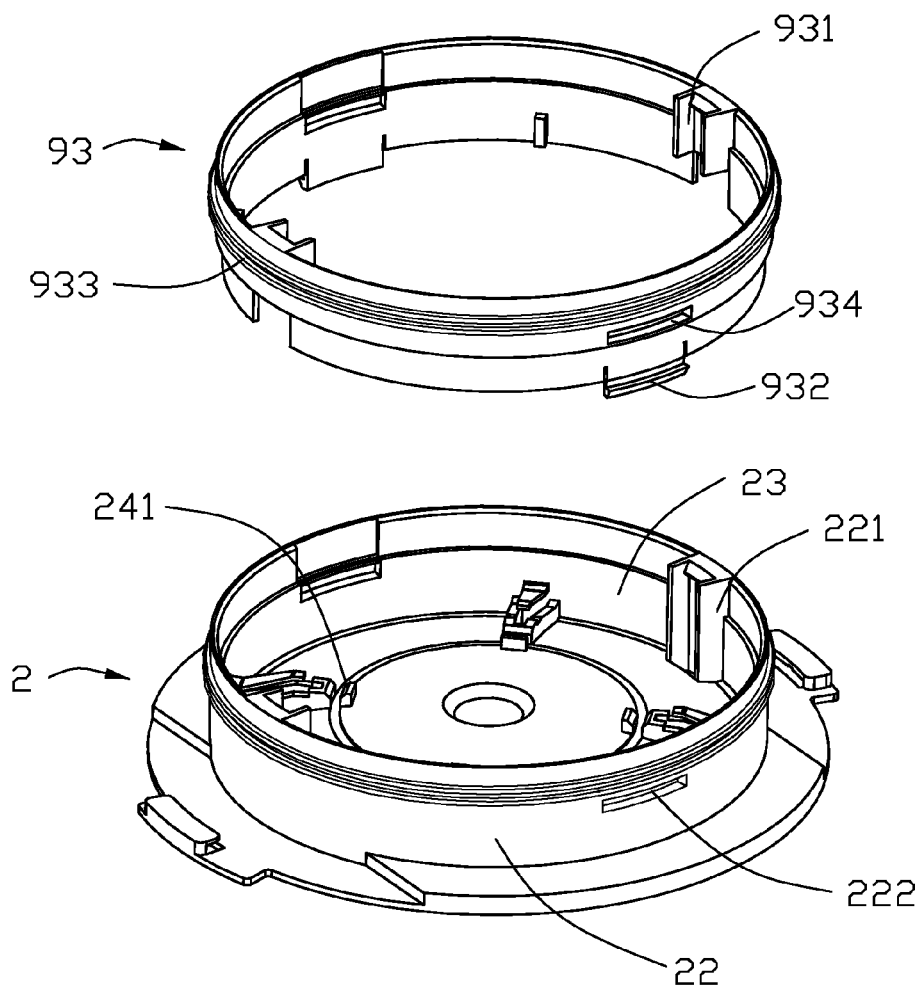
FIG. 9 is a perspective view of a bottom case and a sleeve body shown in FIG. 7.
Figure 10:
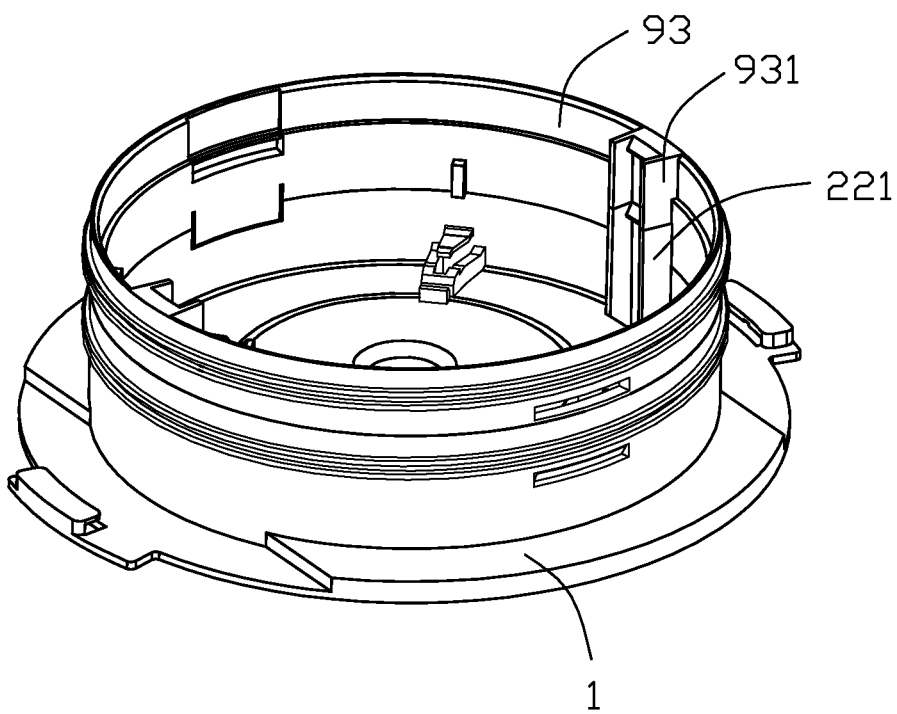
FIG. 10 is a perspective view of a sleeve assembled with the bottom case shown in FIG. 9.

Referring to FIGS. 5-10, a wireless charger assembly 300 according to a second embodiment of the present invention is shown. Compared with the first embodiment, the main difference is that the wireless charger assembly 300 further provides a coil spring 92 and a plurality of sleeves 93 to accommodate different heights of plural exterior flatbeds 200. The coil spring 92 is partly received in the cavity 23 of the bottom case 2. The coil spring 92 has a bottom portion received and retained in the interference grooves 241, and a top portion abutting against the PCB 3. The sleeve 93 includes a latching arm 932 engaging with the retaining apertures 222, a locking ridge 931 and a retaining via 934 to mate with another sleeve, and a plurality of external threads 933 to interwork with the internal thread of one of another sleeve and the top case 8. The sleeves 93 could repeatedly stack one to another along the top-to-bottom direction under condition that a top sleeve engages with the top case 8 and a bottom sleeve engages with the bottom case 2. Therefore, the wireless charger assembly 300 could be assembled corresponding number of sleeves to fit different sizes of the flatbeds 200 of a desk, which could be used at an airport, a coffee shop, a supermarket, a furniture, etc.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed.

What is claimed is:

1. A wireless charger assembly used for transferring power to an electronic device and mounted to an exterior flatbed, the flatbed including a working surface, a non-working surface opposite the working surface, and a through-hole extending through the working surface and the non-working surface, the wireless charger assembly comprising:
   a bottom case including a bottom floor releasably retained to the nonworking surface, a closed loop wall projecting upwardly from the bottom floor to insert in the through-hole, and a cavity defined by the bottom floor and the closed loop wall;
   a top case having a working platform mounted around the working surface of the flatbed, a neck portion extending downwardly from the working platform, and a slot defined by the working platform and the neck portion, the neck portion releasably retained to the closed loop wall;
   a printed circuit board (PCB) disposed between the top case and the bottom case and being close to the top case; and
   a transmitter coil mounted on a top face of the PCB close to the working platform of the top case, the transmitter coil transmitting power to a receiver coil of the electronic device through inductive charging;
   a coil spring located between the PCB and the bottom case, said coil spring having a bottom portion retained to the bottom floor and a top portion abutting against the PCB.

2. The wireless charger assembly claimed in claim 1, further including a sleeve added between the bottom case and the top case to increase distance of the working platform and the non-working surface; said sleeve having a top section engaging with the neck portion of the top case and a bottom section engaging with the closed loop wall of the bottom case.

3. The wireless charger assembly claimed in claim 1, further including a plurality of sleeves mounted one to another along a top-to-bottom direction to increase distance of the working platform and the nonworking surface, the bottom one of the sleeves being mounted to the bottom case and the top one of the sleeves being assembled with the top case.

4. The wireless charger assembly claimed in claim 3, further including a light guiding component with a plurality of guiding holes releasably retained to the top one of the sleeves, and the PCB has a plurality of light emitting diodes (LEDs) mounted thereon and aligned with corresponding guiding holes.

5. The wireless charger assembly claimed in claim 1, further including a light guiding component with a plurality of guiding holes releasably retained to the closed loop wall of the bottom case, and wherein said PCB has a plurality of light emitting diodes (LEDs) mounted thereon and aligned with corresponding guiding holes.

6. The wireless charger assembly claimed in claim 5, wherein said working platform has a transparent circle located above the guiding holes.

7. The wireless charger assembly claimed in claim 6, further including a rubber gasket arranged between the working platform of the top case and the working surface of the flatbed.

8. The wireless charger assembly claimed in claim 5, further including a transparent tray disposed between the top case and the light guiding component.

9. A wireless charger assembly comprising:
   a flatbed defining a through hole extending through opposite upper and bottom surfaces thereof in a vertical direction;
   a holding bracket including a fixing portion secured to the bottom surface;
   a bottom case detachably attached to the holding bracket and defining a bottom floor essentially flush with the bottom surface, and a loop wall extending upwardly from the bottom floor into the through hole;
   a top case connected to the bottom case and defining a working platform essentially complying with the upper surface, said top case cooperating with the bottom case to commonly form a receiving cavity therebetween in the vertical direction;
   a transmitting coil and a printed circuit board associated with each other and commonly moveably disposed within the receiving cavity, and
   a spring disposed in the receiving cavity and constantly urging at least said transmitting coil upwardly close to the working platform; wherein
   the transmitting coil is fixed relative to the printed circuit board, and the spring upward presses a bottom side of the printed circuit board so as to urge both the printed circuit board and the transmitting coil upward toward the top case.

10. The wireless charger assembly as claimed in claim 9, wherein a distance between the working platform of the top case and the bottom floor of the bottom case in the vertical direction is adjustable to compromise different heights among the different flatbeds.

11. The wireless charger assembly as claimed in claim 9, wherein said top case is connected to the bottom case via at least one sleeve upwardly connected to said top case and downwardly connected to the bottom case, respectively.

12. The wireless charger assembly as claimed in claim 11, wherein said sleeve forms external threads on an upper portion thereof and either a latching arm or a retaining aperture is formed in a lower portion thereof for respectively retaining to the top case and the bottom case.

13. The wireless charger assembly as claimed in claim 9, further including a light guiding component disposed in the receiving cavity, wherein said light guiding component guides and expose light onto the upper surface.

14. A wireless charger assembly for use within a through hole of a flatbed having opposite upper surface and bottom surface in a vertical direction, comprising:
   a holding bracket including a fixing portion adapted to be secured to the bottom surface;
   a bottom case detachably attached to the holding bracket and defining a bottom floor adapted to essentially flush with the bottom surface, and a loop wall extending upwardly from the bottom floor and adapted to extend into the through hole;
   a top case connected to the bottom case and defining a working platform adapted to essentially flush with the upper surface, said top case cooperating with the bottom case to commonly form a receiving cavity therebetween in the vertical direction;
   a transmitting coil and a printed circuit board associated with each other and commonly moveably disposed within the receiving cavity; and
   a spring disposed in the receiving cavity and constantly urging at least said transmitting coil upwardly close to the working platform; wherein
   the transmitting coil is fixed relative to the printed circuit board, and the spring upward presses a bottom side of the printed circuit board so as to urge both the printed circuit board and the transmitting coil upward toward the top case.

15. The wireless charger assembly as claimed in claim 14, wherein a distance between the working platform of the top case and the bottom floor of the bottom case in the vertical direction is adjustable for compromising different heights among the different flatbeds.

16. The wireless charger assembly as claimed in claim 14, wherein said top case is connected to the bottom case via at least one sleeve upwardly connected to said top case and downwardly connected to the bottom case, respectively.

17. The wireless charger assembly as claimed in claim 16, wherein said sleeve forms external threads on an upper portion thereof and either a latching arm or a retaining aperture is formed in a lower portion thereof for respectively retaining to the top case and the bottom case.

18. The wireless charger assembly as claimed in claim 14, further including a light guiding component disposed in the receiving cavity, wherein said light guiding component guides and expose light onto the upper surface.

* * * * *